US009350695B2

United States Patent
Lee et al.

(10) Patent No.: US 9,350,695 B2
(45) Date of Patent: May 24, 2016

(54) METHOD FOR TRANSFERRING AND STORING CPM SERVICE MESSAGE AND SERVICE THEREOF

(75) Inventors: Hyeonsoo Lee, Anyang-si (KR); Le Thierry d'Ennequin Christophe, Paris (FR)

(73) Assignee: LG Electronics Inc., Seoul (KR)

( * ) Notice: Subject to any disclaimer, the term of this patent is extended or adjusted under 35 U.S.C. 154(b) by 304 days.

(21) Appl. No.: 13/704,892

(22) PCT Filed: Jun. 21, 2011

(86) PCT No.: PCT/KR2011/004529
§ 371 (c)(1),
(2), (4) Date: Dec. 17, 2012

(87) PCT Pub. No.: WO2011/162536
PCT Pub. Date: Dec. 29, 2011

(65) Prior Publication Data
US 2013/0097265 A1    Apr. 18, 2013

Related U.S. Application Data

(60) Provisional application No. 61/357,968, filed on Jun. 23, 2010, provisional application No. 61/367,462, filed on Jul. 26, 2010.

(30) Foreign Application Priority Data

Mar. 24, 2011    (KR) .................. 10-2011-0026598

(51) Int. Cl.
H04L 12/58 (2006.01)

(52) U.S. Cl.
CPC ............... *H04L 51/38* (2013.01); *H04L 51/04* (2013.01); *H04L 51/16* (2013.01); *H04L 51/36* (2013.01)

(58) Field of Classification Search
CPC ......... H04W 4/14; H04W 80/10; H04W 8/18; H04W 56/00; H04W 88/184; H04W 36/385; H04W 4/18; H04L 51/36; H04L 65/1006; H04L 51/066; H04L 51/16; H04L 12/5895; H04L 51/38; H04L 12/589; H04L 51/04; H04L 67/14; H04L 67/306; H04L 12/5835; H04L 51/00; H04L 65/1016; H04L 65/1083; H04L 65/1069; H04L 67/1095; H04L 67/141; H04L 69/08; H04L 12/581; H04L 12/5855; H04L 128/586; H04L 12/587; H04L 51/24; H04L 65/1089; H04L 65/1093; H04L 67/143; H04L 12/1818; H04L 12/1881; H04L 65/403; H04L 65/4061; H04L 29/06319; H04L 63/065; H04L 63/104; H04L 65/1066; H04L 12/586; H04L 65/1063; H04L 67/148
See application file for complete search history.

(56) References Cited

U.S. PATENT DOCUMENTS

| 8,060,621 | B2 | 11/2011 | Lee et al. |
| 2008/0114881 | A1 | 5/2008 | Lee et al. |

(Continued)

FOREIGN PATENT DOCUMENTS

| KR | 10-2008-0043134 A | 5/2008 |
| KR | 10-2010-0123564 A | 11/2010 |

(Continued)

*Primary Examiner* — Kevin Bates
*Assistant Examiner* — Ranjan Pant
(74) *Attorney, Agent, or Firm* — Birch, Stewart, Kolasch & Birch, LLP

(57) ABSTRACT

A method is described for transferring a converged IP messaging (CPM) service based message using a server. The server transmits one or more messages via a one-to-one session established between a first terminal of a first user and a second terminal of a second user. The server receives a first session initiation protocol (SIP) invite message for extending the one-to-one session to a group session from the first terminal of the first user. The server extracts and locally stores various headers and IDs from the received first SIP invite message, and at least part of session description protocol (SDP) attributes with media streams from the received first SIP invite message if the first SIP invite message includes SDP content describing the media streams. The server transmits a second SIP invite message to the second terminal of the second user, and receives a termination message for terminating the one-to-one session.

15 Claims, 6 Drawing Sheets

(56) References Cited

U.S. PATENT DOCUMENTS

| | | | | |
|---|---|---|---|---|
| 2008/0298351 | A1* | 12/2008 | Buckley | H04W 28/06 370/355 |
| 2009/0150562 | A1* | 6/2009 | Kim | H04N 7/173 709/238 |
| 2009/0279455 | A1* | 11/2009 | Wang | H04L 12/589 370/260 |
| 2010/0011069 | A1* | 1/2010 | Haruna | H04L 51/36 709/206 |
| 2010/0128666 | A1* | 5/2010 | Masson | G06Q 30/02 370/328 |
| 2010/0138484 | A1 | 6/2010 | Lee et al. | |
| 2010/0293240 | A1* | 11/2010 | Lee | H04L 12/1827 709/206 |
| 2010/0325224 | A1* | 12/2010 | Pattan | H04L 65/1006 709/206 |
| 2011/0295965 | A1* | 12/2011 | Eom | H04L 12/586 709/206 |
| 2012/0254449 | A1* | 10/2012 | Henry | H04L 12/1818 709/227 |

FOREIGN PATENT DOCUMENTS

| | | |
|---|---|---|
| KR | 10-2010-0135684 A | 12/2010 |
| WO | WO 2009/138417 A1 | 11/2009 |

* cited by examiner

METHOD FOR TRANSFERRING AND STORING CPM SERVICE MESSAGE AND SERVICE THEREOF

CROSS REFERENCE TO RELATED APPLICATIONS

This application is the National Phase of PCT/KR2011/004529 filed on Jun. 21, 2011, which claims priority under 35 U.S.C 119 (e) to U.S. Provisional Application Nos. 61/357,968 and 61/367,462 filed on Jun. 23, 2010 and Jul. 26, 2010 respectively, and under 35 U.S.C. 119(a) to Patent Application No. 10-2011-0026598 filed in the Republic of Korea on Mar. 24, 2011, all of which are hereby expressly incorporated by reference into the present application.

TECHNICAL FIELD

The present invention relates to a CPM (Converged IP Messaging) service.

BACKGROUND ART

Various services for transmitting and receiving messages through a mobile device include, for example, SMS, MMS, e-mail service, and the like.

However, the services for transmitting and receiving messages variably exist, so recently, there have been attempts for integrating the services. Among the attempts is a CPM (Converged IP Messaging) service.

The CPM service is a service allowing a user to exchange a CPM message in an IMS (IP Multimedia Subsystem). The CPM service supports a pager mode message environment and a session mode message environment. Also, the CPM service supports continuous media as well as discrete media.

In a CPM session, an SIP-based session between a transmission terminal and a reception terminal is generated, and a plurality of messages can be transmitted and received by using the session. In other words, the CPM session allows for an implementation of an instant message service.

FIG. 1 is a schematic block diagram showing the configuration of a network and a terminal for a CPM service.

With reference to FIG. 1, a terminal 10, an SIP/IP network 50, a message storage server 60, an interworking server 70, and a CPM server 80 are illustrated.

First, the terminal 10 includes a message storage client 11 and a CPM client 12. The message storage client 11 stores a transmitted or received message and synchronizes the stored message with the message storage server 60.

The SIP/IP network 50 may be an IMS-based network.

The message storage server 60 may receive a message from the CPM server 80, and stores a transmitted or received message and conversation information with media (conversation history) according to a user preference. The message storage server 60 may share data with the terminal 10 through synchronization. Namely, the message storage server 60 receives a message stored in the terminal 10, stores it, and delivers a message stored in the message storage server 60 to the terminal 10.

The message storage server 60 uses an IMAP protocol for the synchronization. Thus, the message storage server 60 serves as an IMAP server and the terminal 10 operates as an IMAP client.

The interworking server 70 includes an interworking function unit 71 and an interworking selection function unit 72. The interworking function unit 71 may serve to convert a CPM message into an SMS, an MMS, or the like, or convert an SMS, an MMS, or the like, into a CPM message. The interworking selection function unit 72 may serve to determine whether to perform the conversion.

The CPM server 80 includes a CPM participating function (PF) server 81 and a CPM controlling function (CF) server 82. The CPM PF server 81 delivers a message to the message storage server 60. Also, the CPM PF server 81 transmits and receives a message to and from the CPM client 12 of the terminal 10.

FIG. 2 is an exemplary view showing a process of transmitting and receiving a CPM message.

As can be understood from FIG. 2, a terminal A1 10A1 and a terminal A2 10A2 of a user A, a terminal B1 10B1 and a terminal B2 10B2 of a user B, a home network of the user A, a home network of the user B are provided. The home network of the user A includes an SIP/IP network 50A and a CPM PF server 81A. The home network of the user B includes an SIP/IP network 50B and a CPM PF server 81B.

First, the terminal A1 10A1 transmits a CPM message to the CPM PF server 81A via the SIP/IP network 50A according to a request from the user A (steps S01 and S02). At this time, the terminal A1 10 stores the transmitted CPM message in a message storage client.

The CPM PF server 81A transmits the CPM message to the CPM PF server 81B via the SIP/IP network 50A in the home network of the user A and the SIP/IP network 50B in the home network of the user B (steps S03, S04, and S05).

When the CPM PF server 81B receives the CPM message, it transmits the received CPM message to the terminal B1 10B1 of the user B via the SIP/IP network (steps S06 and S07).

Also, when the CPM PF server 81B receives the CPM message, it transmits the received CPM message to the terminal B2 10B2 of the user B via the SIP/IP network 50B (steps S08 and S09).

The terminal B1 10B1 and the terminal B2 10B2 of the user B transmit an OK message to the CPM PF server 81B via the SIP/IP network 81B in the home network of the user B, respectively according to user B's user preference (steps S10 and S11).

Upon receiving the OK message, the CPM PF server 81B transmits the OK message to the CPM PF server 81A of the user A via the SIP/IP network 50B in the home network of the user B and the SIP/IP network 50A in the home network of the user A (steps S12 to S15).

When the CPM PF server 81A in the home network of the user A receives the OK message, it delivers the OK message to the terminal A1 10A1 which has transmitted the CPM message (step S16).

The process of transferring the CPM message has been described.

However, as described above, although the user A exchanges the message with the user B, the message is stored only within the terminal A1. Thus, the user A cannot check what kind of message he has transmitted and received to and from the terminal of the user B by using the terminal A2.

Thus, when the user, who owns several terminals, exchanges a message with a first terminal, the user cannot check the exchanged message without using the first terminal. Namely, the user cannot check the exchanged message by using a second terminal, causing user inconvenience.

DISCLOSURE OF INVENTION

Solution to Problem

Therefore, in order to address the above matters, the various features described herein have been conceived.

An object of the present invention is to allow a user to effectively check messages which have been transmitted and received.

To achieve these and other advantages and in accordance with the purpose of the present invention, as embodied and broadly described herein, there is provided a method for transferring a converged IP messaging (CPM) service based message. The method may be performed by a server for handling terminals. The method may comprise transmitting, by the server, one or more messages via a one-to-one session established between a first terminal of a first user and a second terminal of a second user; receiving, by the server, a session initiation message for generating a group session from the first terminal of the first user. The session initiation message may include a header indicating that the session is to be replaced. The session initiation message may include a field indicating an identifier of the second terminal of the second user and an identifier of a third user. The session initial message may include the same conversation ID as that of the one-to-one session and includes a new contribution ID different from that of the one-to-one session. The method may further comprise transmitting, by the server, the session initiation message to the second terminal of the second user in response to the reception of the session initiation message; receiving, by the server, a termination message for terminating the one-to-one session from the particular terminal of the second user; transmitting, by the server, a termination message for terminating the one-to-one session to the first terminal in response to the reception of the termination message; receiving, by the server, a response message from the first terminal; constructing, by the server, one session history object including all messages transmitted between the terminals during the one-to-one session in response to the reception of the response message, wherein the one session history object further includes locally stored information including the conversation ID and the contribution ID; receiving, by the server, a termination message for leaving the group session established among the first terminal of the first user, the second terminal of the second user, and a third terminal of the third user from any one of the first terminal, the second terminal and the third terminal; and constructing, by the server, a new session history object including all the messages transmitted and received during the group session, in response to the reception of the termination message. The new session history object may include the same conversation ID and a new contribution ID. If each of the messages transmitted and received during the group session includes real-time media, the real time media may be constructed as a single MIME object, and the single MIME object may be included in the new session history object.

The method may further comprise receiving a response message from the second terminal of the second user after transmitting the session initiation message to the second terminal of the second user; and extracting information in the received session initiation message and locally storing the extracted information after receiving the response message; and transmitting a response message to the first terminal of the first user in response to the reception of the response message.

The method may further comprise after transferring the response message, receiving, by the server, an acknowledgement message from the first terminal; and transmitting, by the server, an acknowledgement message to the second terminal in response to the reception of the acknowledgement message.

The transmitting of the session initiation message to the second terminal of the second user may comprise checking, by the server, the session initiation message in response to the reception of the session initiation message; and if the session initiation message includes the header indicating that the session is to be replaced and information indicating that the session is the same as the one-to-one session, transmitting, by the server, a session initiation message directly to only the second terminal of the second user rather than to all registered terminals of the second user.

The session initiation message may be an SIP-based INVITE message, the response message may be an SIP-based 200 OK message, and the termination message may be an SIP-based BYE message.

The header indicating that the session is to be replaced may be a Session Replace header, and the identifier of the second terminal may be a GRUU, and the field including the identifier may be a Request-URI field.

To achieve these and other advantages and in accordance with the purpose of the present invention, as embodied and broadly described herein, there is provided a method for transferring a converged IP messaging (CPM) service based message. The method may be performed by a server for handling a source terminal. The method may comprise receiving, by the server, a session initiation message for establishing a CPM session between the source terminal and one or more of target entities from the source terminal. If there exists an existing conversation ID, the session initiation message may include the existing conversation ID. If there is no existing conversation ID, the session initiation message may include a newly generated conversation ID. The session initiation message may further include a newly generated contribution ID. The method may further comprise transmitting, by the server, a session initiation message to the one or more of the target entities in response to the reception of the session initiation message; receiving, by the server, a response message from the one or more of the target entities; transferring, by the server, one or more messages including one or more of a text, an image, a video, and a voice between the source terminal and the one or more of the target entities through a generated session; receiving, by the server, a termination message for terminating the generated session from the source terminal; constructing one session history object including all the messages transmitted and received through the session after receiving the termination message. The session history object may include the conversation ID and the contribution ID. If each of the messages transmitted and received in the session includes real-time media, the real-time media may be constructed as a single MIME object and the single MIME object may be included in the session history object.

The session initiation message may be an SIP-based INVITE message, the response message may be an SIP-based 200 OK message, and the termination message may be an SIP-based BYE message.

The method may further comprise checking a user preference with respect to the user of the source terminal after receiving the termination message. The construction step of the history object may be performed if in the user preference there is an element indicating that a history of the session has to be stored.

The method may further comprise extracting information from the received session initiation message and locally storing the extracted information and extracting information from the received termination message and locally storing the extracted information.

The method may further comprise if each message is received in units of chunks, waiting for all chucks before delivering the message.

To achieve these and other advantages and in accordance with the purpose of the present invention, as embodied and broadly described herein, there is provided a converged IP messaging (CPM) server transferring a message. The server may comprise a transceiver; and a processor configured to control the transceiver. The processor controls the transceiver to perform: transmitting one or more messages via a one-to-one session established between a first terminal of a first user and a second terminal of a second user; receiving a session initiation message for generating a group session from the first terminal of the first user. The session initiation message may include a header indicating that the session is to be replaced. The session initiation message includes a field indicating an identifier of the second terminal of the second user and an identifier of a third user. The session initial message may include the same conversation ID as that of the one-to-one session and may include a new contribution ID different from that of the one-to-one session. The processor controls the transceiver to further perform: transmitting the session initiation message to the second terminal of the second user in response to the reception of the session initiation message; receiving a termination message for terminating the one-to-one session from the particular terminal of the second user; transmitting a termination message for terminating the one-to-one session to the first terminal in response to the reception of the termination message; receiving a response message from the first terminal; constructing one session history object including all messages transmitted between the terminals during the one-to-one session in response to the reception of the response message, wherein the one session history object further includes locally stored information including the conversation ID and the contribution ID; receiving a termination message for leaving the group session established among the first terminal of the first user, the second terminal of the second user, and a third terminal of the third user from any one of the first terminal, the second terminal and the third terminal; and constructing a new session history object including all the messages transmitted and received during the group session, in response to the reception of the termination message. The new session history object may include the same conversation ID and a new contribution ID. If each of the messages transmitted and received during the group session includes real-time media, the real time media is constructed as a single MIME object, the single MIME object may be included in the new session history object. The transmitting of the session initiation message may comprises: checking the session initiation message in response to the reception of the session initiation message; and if the session initiation message includes a header indicating that the session is to be replaced and information indicating that the session is the same as the one-to-one session, transmitting a session initiation message directly to only the second terminal of the second user, rather than to all of the terminals of the second user.

The session initiation message may be an SIP-based INVITE message, the response message may be an SIP-based 200 OK message, and the termination message may be an SIP-based BYE message.

The header indicating that the session is to be replaced is a Session Replace header, and the identifier of the second terminal is a GRUU, and the field including the identifier is a Request-URI field.

The foregoing and other objects, features, aspects and advantages of the present invention will become more apparent from the following detailed description of the present invention when taken in conjunction with the accompanying drawings.

BRIEF DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

In the drawings.

MODE FOR THE INVENTION

Figure 1:
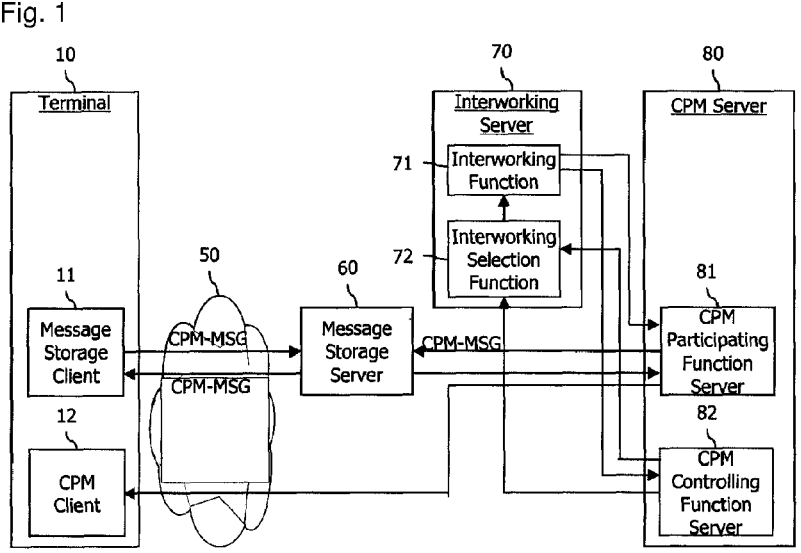
FIG. 1 is a schematic block diagram showing the configuration of a network and a terminal for a CPM service.
Figure 2:
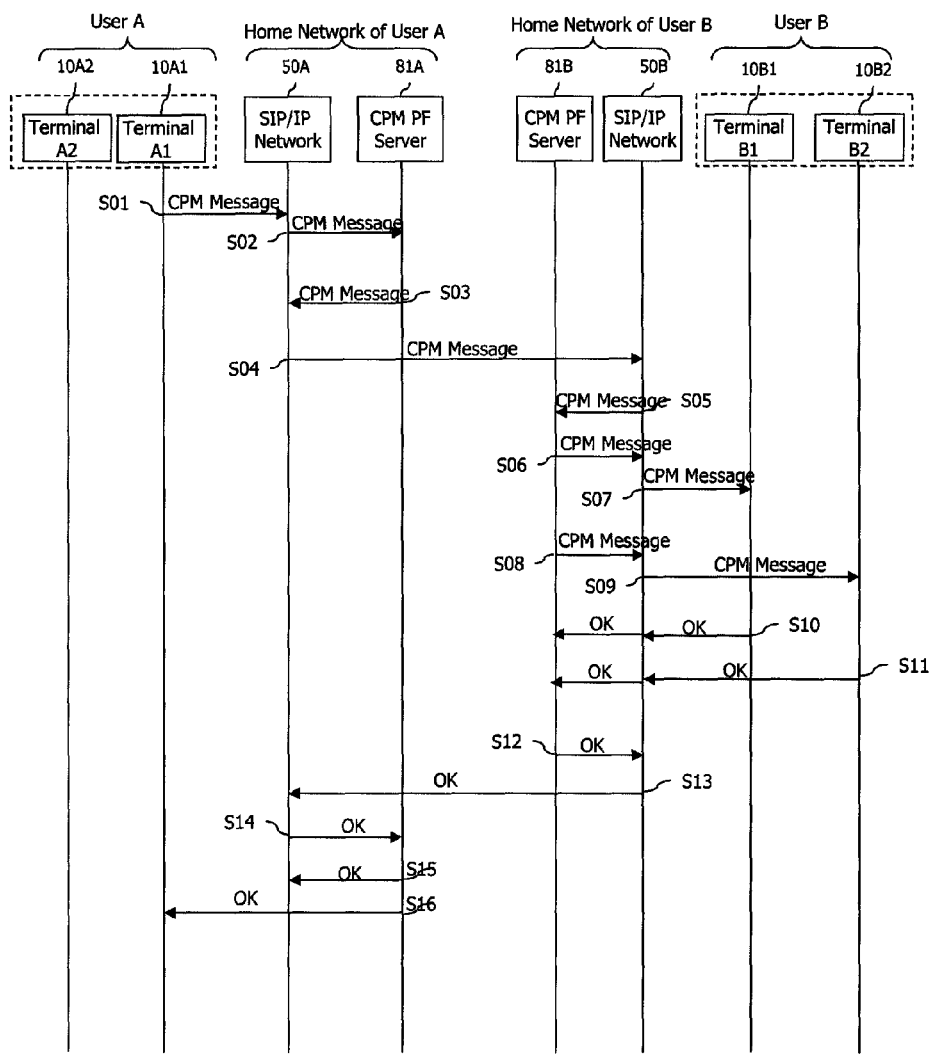
FIG. 2 is a flow chart illustrating the process of transmitting and receiving a CPM message.

The present invention is applied to a CPM (Converged IP Messaging) service. However, the present invention is not limited thereto and may be applicable to any message service, e.g., an SMS, an EMS, an MMS, or the like, to which the technical idea of the present invention is applicable.

The terminology used herein is for the purpose of describing particular embodiments only and is not intended to be limiting of the invention. Unless otherwise defined, all terms used herein have the same meaning as commonly understood by one of ordinary skill in the art to which this invention pertains, and should not be interpreted as having an excessively comprehensive meaning nor as having an excessively contracted meaning. If technical terms used herein is erroneous that fails to accurately express the technical idea of the present invention, it should be replaced with technical terms that allow the person in the art to properly understand. The general terms used herein should be interpreted according to the definitions in the dictionary or in the context and should not be interpreted as an excessively contracted meaning.

As used herein, the singular forms "a", "an" and "the" are intended to include the plural forms as well, unless the context clearly indicates otherwise. It will be further understood that the terms "comprises" "comprising," "includes" and/or "including" when used herein, specify the presence of stated features, integers, steps, operations, elements, and/or components, but do not preclude the presence or addition of one or more other features, steps, operations, elements, components, and/or groups thereof.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention.

It will be understood that when an element is referred to as being "connected with" another element, it can be directly connected with the other element or intervening elements may also be present. In contrast, when an element is referred to as being "directly connected with" another element, there are no intervening elements present.

The exemplary embodiments of the present invention will now be described with reference to the accompanying drawings, in which like numbers refer to like elements throughout. In describing the present invention, if a detailed explanation for a related known function or construction is considered to unnecessarily divert the gist of the present invention, such explanation has been omitted but would be understood by those skilled in the art. The accompanying drawings of the present invention aim to facilitate understanding of the present invention and should not be construed as limited to the accompanying drawings. The technical idea of the present invention should be interpreted to embrace all such alterations, modifications, and variations in addition to the accompanying drawings.

DEFINITION OF TERMS

CPM (Converged IP Messaging): Converged IP messaging service.

CPM client: Client software program which is able to transmit and receive a CPM message as shown in FIG. 1.

Message storage client: It stores a message transmitted and received as shown in FIG. 1 and performs synchronization with a message storage server.

CPM PF server (CPM Participating Function Server): It serves to transfer a message to the CPM client as shown in FIG. 1. It serves to deliver the message to the message storage server 60 as shown in FIG. 1. Also, it serves to receive a converged message from an interworking function part 71 as shown in FIG. 1.

Message storage server: It stores a message received from the CPM PF server and performs synchronization with the message storage client 11.

Interworking selection function part: It serves to determine whether to perform an interworking function.

The interworking function part: it serves to convert a CPM message into an SMS, an MMS, or the like, or convert an SMS, MMS, or the like, into a CPM message.

IMAP (Internet Messaging Access Protocol): It is a communication protocol for reading a mail in an Internet mail server.

CPM Large Message Mode: it is a mode for transmitting a large CPM message by using an MSRP (Message Session Relay Protocol).

CPM Pager Mode: it is a mode for transmitting and receiving a CPM message having a limited size without setting an MSRP session.

CPM session: Interworking among two or more participants in order to exchange CPM messages and continuous media.

A terminal is illustrated in FIGS. 4 to 9, and here, the terminal may be called by other names such as user equipment (UE), mobile equipment (ME), or mobile station (MS). Also, the terminal may be a portable device having a communication function such as a PDA, a smartphone, a notebook computer, or the like, or a device which cannot be carried around, like a PC, a vehicle-mount device.

Figure 3:
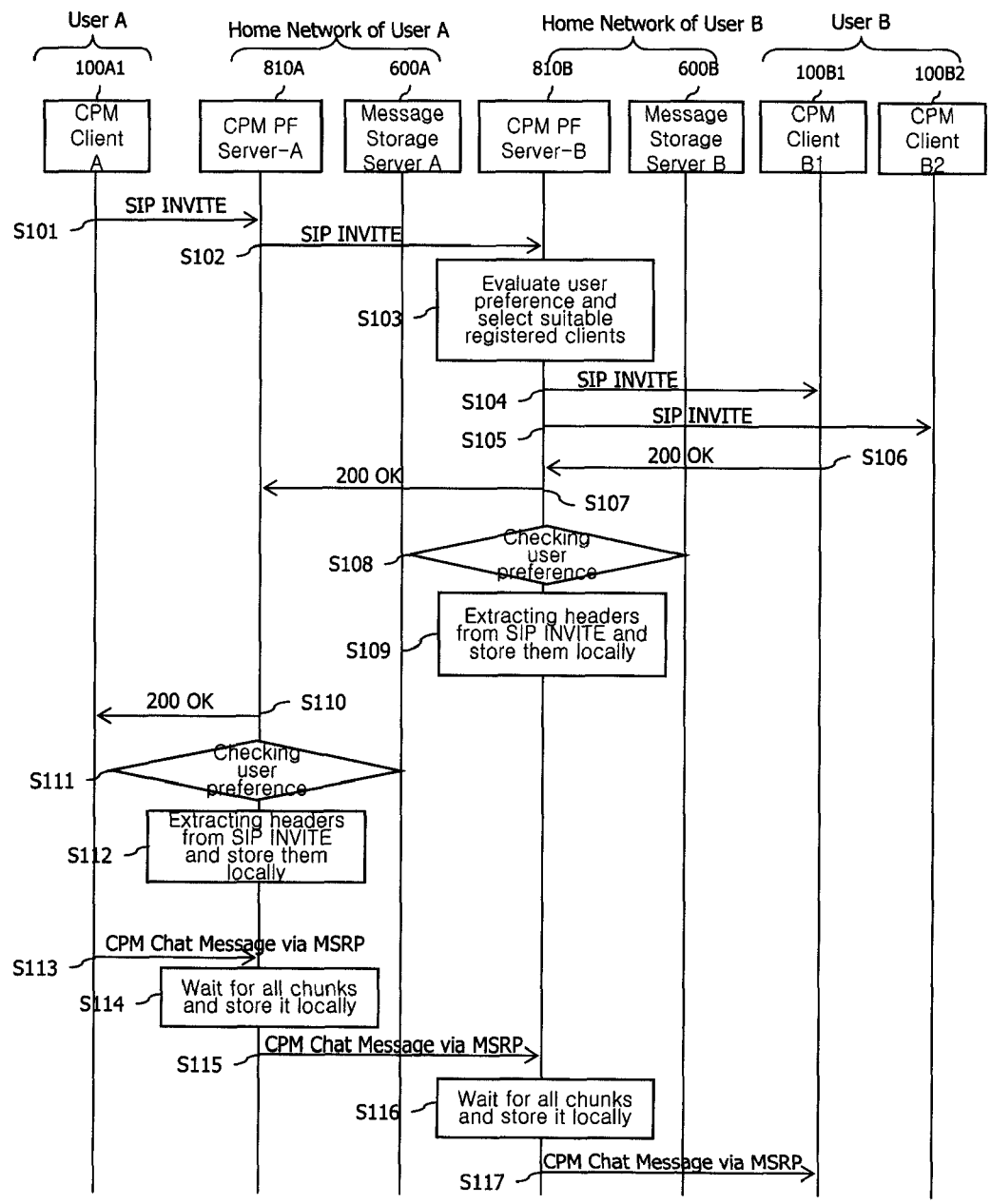
FIGS. 3 and 4 are flow charts illustrating the process of a first embodiment of the present invention.
Figure 4:
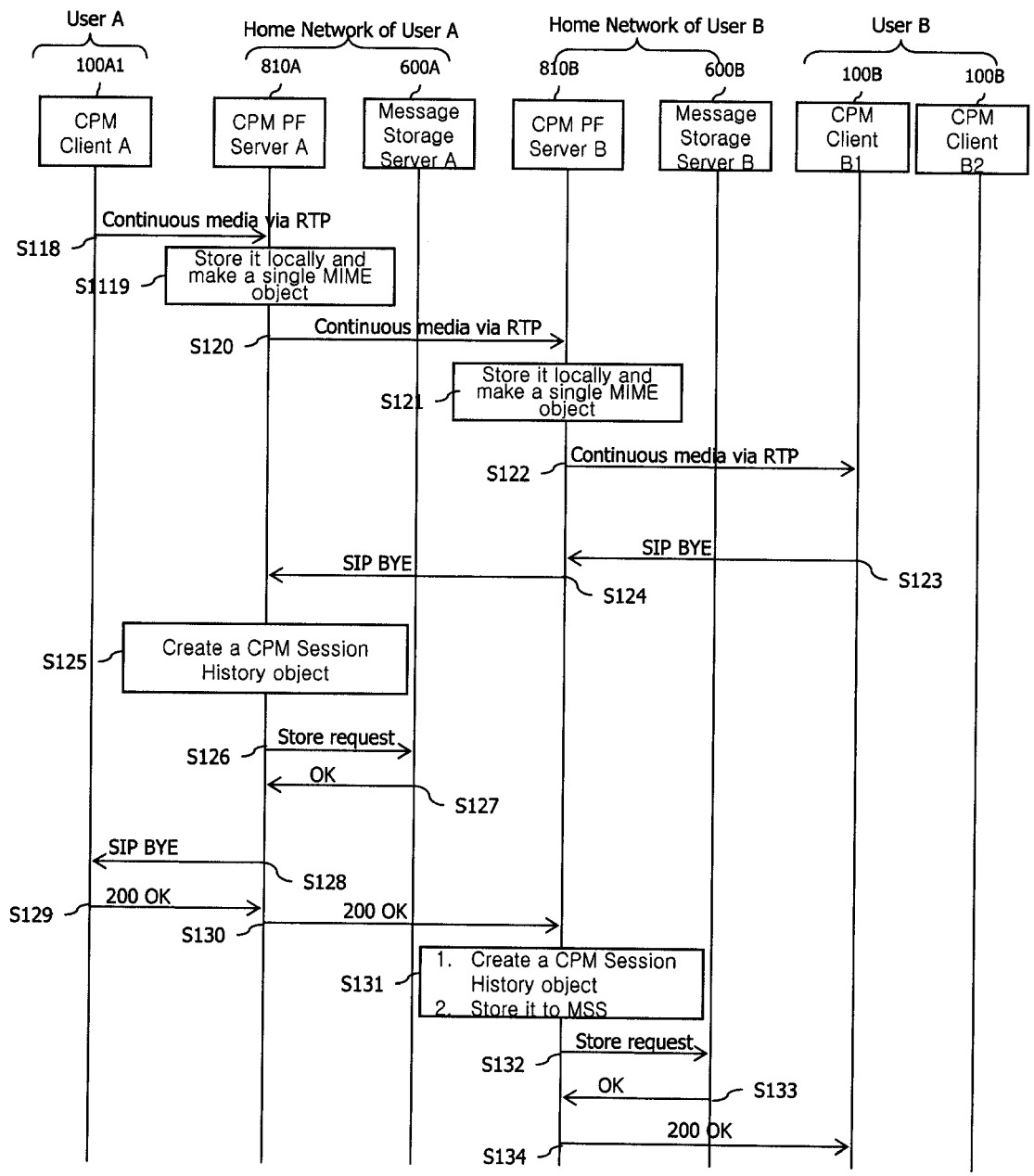

FIGS. 3 and 4 are flow charts illustrating a first embodiment of the present invention.

In FIGS. 3 and 4, a terminal A1 100A1 of a user A, a terminal B1 100B1 and a terminal B2 100B2 of a user B, a home network of the user A, and a home network of the user B are shown. The home network of the user A includes a CPM PF server-A 810A and a message storage server-A 600A. Similarly, the home network of the user B includes a CPM PF server-B 810B and a message storage server-B 600B. Each of the terminals includes a message storage client and a CPM client.

This will be described in detail as follows.

1) When the user A requests sending of a message, the terminal A1 100A1 first transmits a session invitation message, e.g., an SIP-based INVITE message, to the CPM PF server-A 810A via an SIP/IP network 500A in the home network of the user A in order to transmit the message (step S101). In detail, the terminal A1 100A1 generates the session invitation message as follows. The terminal A1 100A1 includes the address of a target CPM Principal or the address of a non-CPM Principal in a Request-URI field of the message. Subsequently, the terminal A1 100A1 sets a CPM Feature tag and includes it in an Accept-Contact header of the message. And then, the terminal A1 100A1 includes a CPM Feature tag in a Contact header. And then, the terminal A1 100A1 includes a CPM address of the user as the address of an authenticated sender. When anonymity is requested, the terminal A1 100A1 includes a temporary GRUU in the Contact header of an origination CPM client. When anonymity is not requested, the terminal A1 100A1 includes a public GRUU in the Contact header. When anonymity is requested, the terminal A1 100A1 includes a value 'id' in a Privacy header. And then, the terminal A1 100A1 includes an option tag 'timer' and an option tag 'gruu' in a Supported header. The terminal A1 100A1 sets a refresher parameter as 'uac' in a Session-Expires header. Since the session invitation message is to start new CPM conversation, the CPM client of the terminal A1 100A1 includes a conversation-ID indicating a newly generated conversation ID in a Conversation-ID header. The CPM client of the terminal A1 100A1 includes a Contribution-ID value indicating a newly generated contribution ID in the contribution-ID header in a sense that it newly contributes by using the conversation ID. The terminal A1 100A1 includes a MIME SDP body. In this manner, when the terminal A1 100A1 completes generating of the session invitation message, it transmits the generated session invitation message.

2) When the CPM PF server-A 810A in the home network of the user A receives the session invitation message, it checks the received session invitation message.

In detail, the CPM PF server-A 810A in the home network of the user A checks whether or not the CPM address of the authenticated sender in the session invitation message has been allowed to transmit the request. If the CPM address of the authenticated sender has been allowed, the CPM PF server-A 810A transmits a 'Forbidden' response. And, the CPM PF server-A 810A includes a warning sentence "127 Service not authorized" in a warning header in the response message. When the CPM address of the authenticated sender has been allowed and the CPM PF server-A 810A requests a particular user agent version, the CPM PF server-A 810A checks a 'User Agent' header in the session invitation message in order to check whether or not a user agent version is supported. When the user agent version is not supported, the CPM PF server-A 810A transmits a "Forbidden" response message. When the user agent version is supported, the CPM PF server-A 810A checks whether or not the message has been transmitted anonymously. When the CPM PF server-A 810A does not support anonymity but the message has been transmitted anonymously, the CPM PF server-A 810A transmits a "Forbidden" response message. In this case, the CPM PF server-A 810A includes a warning sentence "119 Anonymity not allowed" in the Warning header of the response message. The CPM PF server-A 810A checks whether or not an "Expires" header is included in the session invitation message.

Meanwhile, when the CPM PF server-A 810A is at its own media path, the CPM PF server-A 810A generates a new session invitation message, duplicates a Request-URI in the received message, includes the duplicated Request-URI in the generated session invitation message, and operates as B2BUA according to an RFC3261 rule and procedure. The CPM PF server-A 810A includes a User-Agent header indicating its OMA CPM release version in the session invitation message. And, the CPM PF server-A 810A duplicates a Contact header and an Accept-Contact header in the received message, and includes the duplicated headers in the generated message. Subsequently, the CPM PF server-A 810A includes a URI indicating its address in the Contact header of the generated session invitation message. And then, the CPM PF server-A 810A includes an SDP body in the generated message on the basis of an SDP in the received message.

Thereafter, the CPM PF server-A 810A transmits the generated session invitation message to the CPM PF server-B 810B in the home network of the user B (step S102).

3) When the CPM PF server-B 810B receives the message, it checks the session invitation message (step S103).

In detail, when the CPM PF server-B 810B requests a particular user agent version, the CPM PF server-B 810B checks a "User Agent" header in the session invitation message in order to check whether or not the user agent version is supported. When the user agent version is not supported, the CPM PF server-B 810B transmits a "Forbidden" response message. When the user agent version is supported, the CPM PF server-B 810B checks whether or not the message has been transmitted anonymously. When the CPM PF server-B 810B does not support anonymity but the message has been transmitted anonymously, the CPM PF server-B 810B transmits a "Forbidden" response message. In this case, the CPM PF server-B 810B includes a warning sentence "119 Anonymity not allowed" in a warning header f the response message.

The CPM PF server-B 810B checks whether or not the CPM address of the authenticated sender is included in a black list, e.g., oma_blockedcontacts. When the CPM address of the authenticated sender is included in the black list, the CPM PF server-B 810B transmits a "Forbidden" response message.

The CPM PF server-B 810B checks whether or not there is a rule in the user setting of the receiver, i.e., the user B, and an enabled service in the rule has been set as CPM. When the enabled service is CPM, the CPM PF server-B 810B checks whether or not an allow-do-not disturb-element has been set as "true". When the allow-do-not-disturb element has been set as 'true', the CPM PF server-B 810B transmits a "Temporarily Unavailable" response message.

However, when the allow-do-not-disturb element has not been set as "true", the CPM PF server-B 810B checks SDP attributes with respect to the policy of a service provider set for the service or the user. When the SDP media type in the received message does not follow the policy of the service provider, the CPM PF server-B 810B transmits a SIP 488 "Not Acceptable Here" message.

However, when the SDP media type follows the policy, the CPM PF server-B 810B checks whether or not at least one or more terminals registered to the home network exist for the receiver, i.e., the user B. When there is one or a plurality of registered terminals, the CPM PF server-B 810B selects appropriate terminals from among the one or the plurality of registered terminals. If, however, there is no appropriate registered terminal, the CPM PF server-B 810B checks the policy of the service provider. When the policy of the service provider has been set to select appropriate CPM clients, the CPM PF server-B 810B checks the capabilities of each terminal, namely, the use setting of each terminal. Here, the appropriate CPM client refers to a CPM client which is able to receive the message. When the policy of the service provider has been set to reject the session invitation, the CPM PF server-B 810B transmits an SIP-based 480 "Temporarily Unavailable" message. However, when the policy of the service provider has been set to transfer the session invitation by using a non-CPM service, the CPM PF server-B 810B transmits the session invitation message to an ISF responsible for interworking.

However, when the policy of the service provider has been set to transfer the session invitation and there is an appropriate terminal, the CPM PF server-B 810B generates a new session invitation message, duplicates a Request-URI in the received message and includes the duplicated Request-URI in the generated session invitation message, and operates as B2BUA according to the RFC3261 rules and procedures. The CPM PF server-A 810A includes a User-Agent header indicating its OMA CPM release version in the session invitation message. And, the CPM PF server-B 810B duplicates a Contact header and an Accept-Contact header in the received message, and includes the duplicated headers in the generated message. Subsequently, the CPM PF server-B 810B includes a URI indicating its address in the Contact header of the generated session invitation message. And then, the CPM PF server-B 810B includes an SDP body in the generated message on the basis of an SDP in the received message.

The CPM PF server-B 810B determines whether or not any of the registered terminals of the received, i.e., the user B, is appropriate for receiving the request. When there is at least one terminal appropriate for receiving the request, the CPM PF server-B 810B includes an instant ID of an inappropriate terminal in the Reject-Contact header, sets a "fork" value in a fork-directionality attribute in a Request-Disposition header, and includes a "parallel" value in a parallel-directionality attribute.

4~5) When the session invitation message is generated in this manner, the CPM PF server-B 810B transmits the generated session invitation message to an SIP/IP core such that the session invitation message can be transferred to the appropriate registered terminals, e.g., the terminal B1 100B1 and the terminal B2 100B2, of the receiver, i.e., the user B (steps S104 and S105).

6) Among the terminal B1 100B1 and the terminal B2 100B2 which have received the session invitation message, the terminal B1 100B1 transmits a response message, e.g., an SIP 200 "OK" message, to the CPM PF server-B 810B (step S106).

7) Subsequently, the CPM PF server-B 810B generates a new response message, e.g., an SIP 200 "OK" message, on the basis of the received response message.

The CPM PF server-B 810B includes an SDP body on the basis of the SDP in the received response message. Also, the CPM PF server-B 810B includes an SIP URI allowing the original SIP URI in the Contact header of the received response message to be known in the generated response message. Subsequently, the CPM PF server-B 810B transmits the generated message to the SIP/IP core so as to be transmitted to the CPM PF server A 810A (step S107).

8~9) Thereafter, the CPM PF server-B 810B checks a user setting of the user B (step S108). In detail, the CPM PF server-B 810B checks whether or not an <allow-offline-storage> element has been set as "true" in the user setting.

When the <allow-offline-storage> element has been set as "true", the CPM PF server-B 810B extracts "From" header, "To" header, "Date" header, Conversation ID, and Contribution ID from the session invitation request message and stores the same locally (step S109). Subsequently, when there is SDP content describing a media stream in the session invitation request message, the CPM PF server-B 810B may extract a portion of the SDP attributes and locally stores the same.

10) Meanwhile, when the CPM PF server A 810A receives the response message, e.g., the SIP 200 "OK" message, the CPM PF server A 810A generates a new response message, e.g., an SIP 200 "OK", on the basis of the received response message. Subsequently, the CPM PF server A 810A includes a Server header indicating its OMA CPM release version in the generated response message. The CPM PF server A 810A includes the SDP body on the basis of the SDP in the generated response message. The CPM PF server A 810A includes an SIP URI allowing the original SIP URI in the Contact header of the received response message to be known in the generated response message. Subsequently, the CPM PF server-A 810A transmits the generated message to the SIP/IP core so as to be transmitted to the terminal A1 100A1 of the user A (step S110).

11~12) Thereafter, the CPM PF server-A 810A checks a user setting of the user A (step S111). In detail, the CPM PF server-A 810A checks whether or not an <allow-offline-storage> element has been set as "true" in the user setting.

When the <allow-offline-storage> element has been set as "true", the CPM PF server-A 810A extracts "From" header, "To" header, "Date" header, Conversation ID, and Contribution ID from the session invitation request message and stores the same locally (step S112).

13) Meanwhile, the terminal A1 100A1 transmits a message, e.g., an MSRP SEND message, including one or a plurality of media, to the CPM PF server-A 810A (step S113). The one or a plurality of media may include different types of media, e.g., text, photo, a video clip, and an audio clip. When the different types of media are included in the message, the message may be divided into chunks and then transmitted.

14) Then, the CPM PF server-A 810A waits until such time as all the chunks of the message, e.g., the MSRP SEND message, are received, and when all the chunks are received, the CPM PF server-A 810A locally stores the message (step S114).

15~17) Subsequently, the CPM PF server-A 810A transmits the message to the CPM PF server-B 810B responsible for handling the user B (step S115). Then, the CPM PF server-B 810B waits until such time as all the chunks of the message, e.g., the MSRP SEND message, and when all the chunks are received, the CPM PF server-B 810B stores the message locally (step S116). The CPM PF server-B 810B transmits the message to the terminal B1 of the user B (step S117).

18~22) Thereafter, as can be understood with reference to FIG. 4, the terminal A1 100A1 transmits a message, e.g., an RTP message, including one or a plurality of media to the CPM PF server-A 810A (step S118), and the CPM PF server-A 810A locally stores the message (step S119). In detail, the CPM PF server-A 810A generates a single MIME object by using the media in the received message. Subsequently, the CPM PF server-A 810A transfers the message to the CPM PF server-B 810B (step S120), and the CPM PF server-B 810B locally stores the message and transfers the message to the terminal B1 100B1.

23) In order to terminate the conversation, the terminal B1 100B1 generates a termination message, e.g., an SIP BYE message, and transmits the termination message to the CPM PF server B 810B (step S123). At this time, the terminal B1 100B1 releases the resources of all the media of the session to be terminated.

24) Upon receiving the termination message with respect to the ongoing session, the CPM PF server-B 810B releases the all the media resources with respect to the session.

When the termination message has been first transmitted from the terminal B1 100B1 handled by the CPM PF server-B 810B, the CPM PF server-B 810B generates a termination message to be transmitted to the different terminal. And then, the CPM PF server-B 810B transmits the generated termination message to the CPM PF server-A 810A (step S124).

25~27) When the CPM PF server-A 810A receives the termination message with respect to the ongoing session, the CPM PF server-A 810A releases all the media resources with respect to the session.

When the termination message has been first transmitted from the different terminal, e.g., the terminal B1 100B1, rather than from the terminal A1 100A1 handled by the CPM PF server-A 810A, the CPM PF server-A 810A checks whether or not an <allow-offline-storage> element has been set as "true" in the user setting of the user A.

When the <allow-offline-storage> element has been set as "true", the CPM PF server-A 810A creates a CPM session history object by using the locally stored messages (step S125). In detail, the CPM PF server-A 810A generates one CPM session history by using the information regarding the CPM session which has been established, the received media, and the received messages. At this time, the CPM PF server-A 810A generates the one CPM session history by using the generated single MIME object.

Thereafter, the CPM PF server-A 810A transmits the created CPM session history object to the message storage server A 600A to request the message storage server A 600A to store the CPM session history object (step S126).

The message storage server A 600A stores the object, and transmits a response message including information, e.g., a UID, regarding the object, e.g., an SIP 200 OK message, to the CPM PF server-A 810A (step S127).

28) Meanwhile, since the termination message has been first transmitted from the different terminal, e.g., the terminal B1 100B1, not from the terminal A1 100A1 handled by the CPM PF server-A 810A, the CPM PF server-A 810A generates a termination message to be transmitted to the terminal A1 100A1. In this case, the CPM PF server-A 810A includes the information, e.g., the UID, regarding the object stored in the message storage server A 600A, in the generated termination message.

And then, the CPM PF server-A 810A transmits the termination message to the terminal A1 100A1 (step S128).

29) When the terminal A1 100A1 receives the termination message, the terminal A1 100A1 releases the resource regarding the ongoing session, and transmits a response message, e.g., an SIP 200 OK message, to the CPM PF server-A 810A (step S129).

30) Upon receiving the response message, the CPM PF server-A 810A generates a new response message, e.g., an SIP 200 "OK" message, on the basis of the received response message in the same manner as in step S110, and transmits the new response message to the CPM PF server-B 810B (step S130).

31~33) When the CPM PF server-B 810B receives a response message from the different terminal with respect to the session termination message transmitted by the terminal, e.g., the terminal B1 100B1, handled by the CPM PF server-B 810B, the CPM PF server-B 810B generates a response message to be transmitted to the terminal handled by the CPM PF server-B 810B.

Subsequently, the CPM PF server-B 810B checks whether or not the <allow-offline-storage> element has been set as "true" in the user setting of the user B.

When the <allow-offline-storage> element has been set as "true", the CPM PF server-B 810B creates a CPM session history object by using the locally stored messages (step S131). In detail, the CPM PF server-B 810B creates one CPM session history object by using information regarding the CPM session which has been established, the received media, and the received messages.

And then, the CPM PF server-B 810B transmits the created CPM session history object to the message storage server B 600B to request for the message storage server B 600B to store it (step S132).

The message storage server B 600B stores the object, and transmits a response message including information, e.g., UID, regarding the object, e.g., an SIP 200 OK message, to the CPM PF server-B 810B (step S133).

34) Then, the CPM PF server-B 810B includes the information, e.g., the UID, regarding the object stored in the message storage server B 600B in the response message which has been generated so as to be transmitted to the terminal B1.

Thereafter, the CPM PF server-B 810B transmits the termination message to the terminal B 100B (step S134).

As described above, according to the first exemplary embodiment of the present invention, all the messages transmitted for conversation (even the session invitation message transmitted to establish the session for conversation) are stored by using the conversation ID and the contribution ID. Thus, the user A and the user B can read the stored conversation history any time through a certain terminal by using the conversation ID, the contribution ID, and the information regarding the object.

Figure 5:
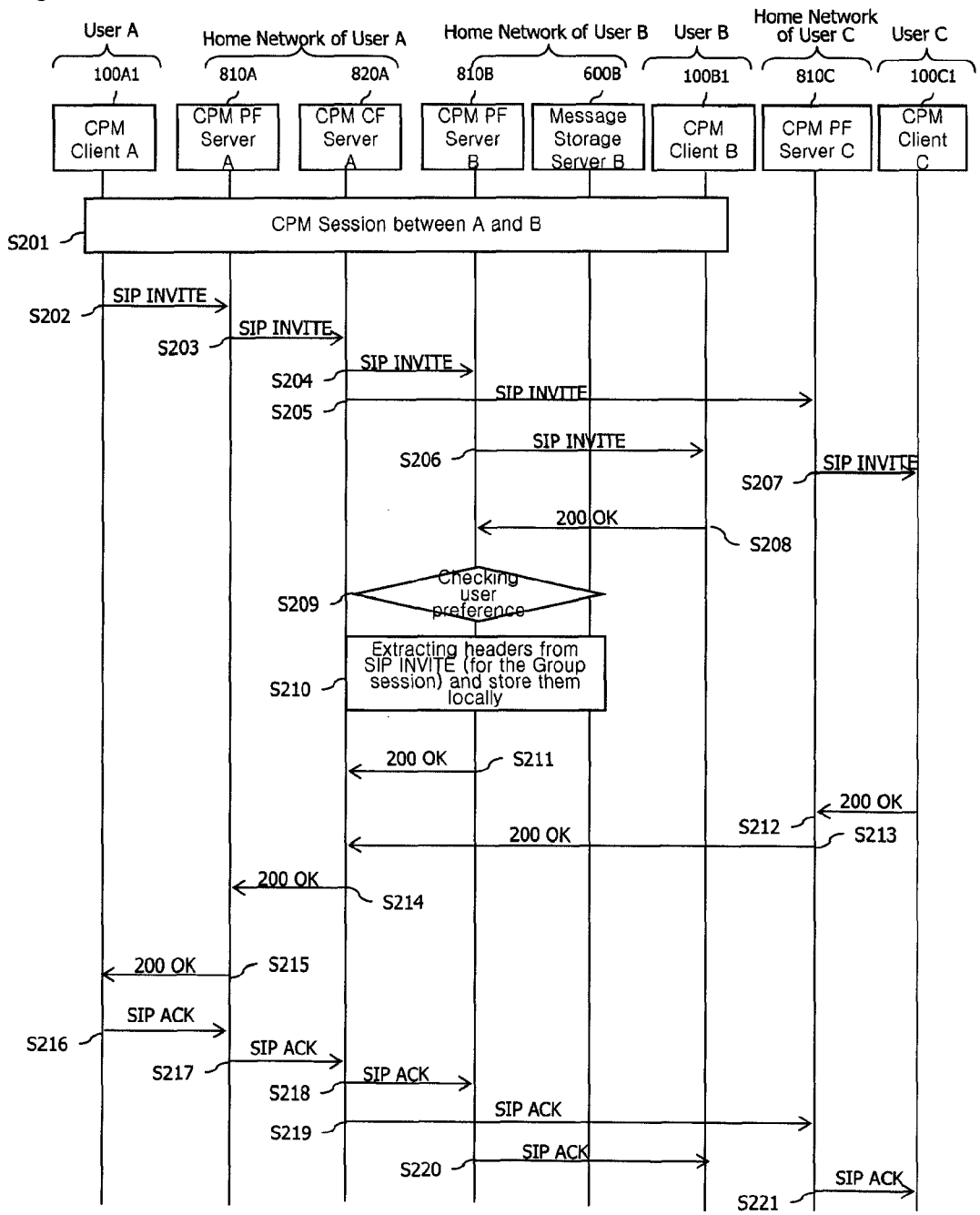
FIGS. 5 to 7 are flow charts illustrating the process of a second embodiment of the present invention.
Figure 6:
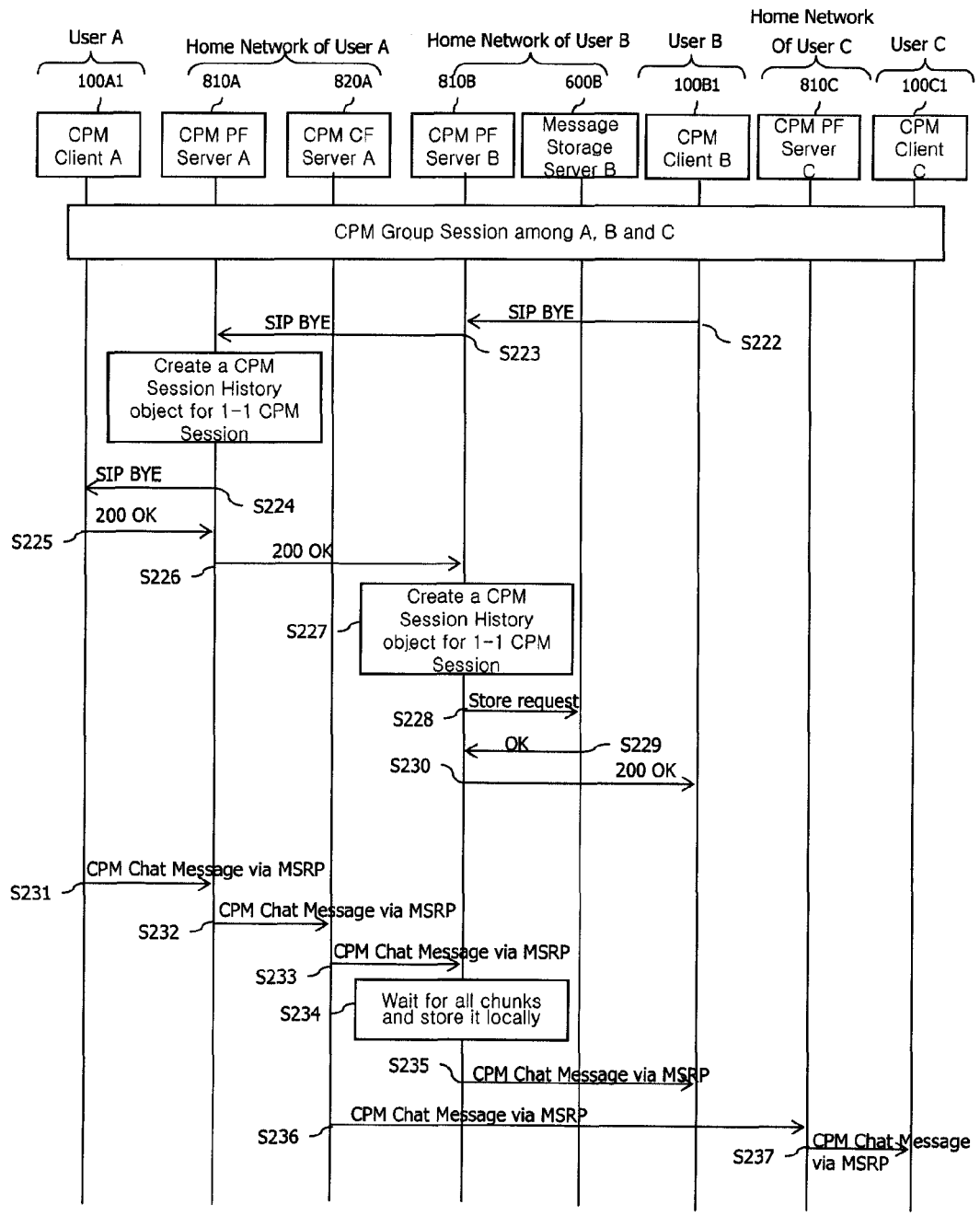
Figure 7:
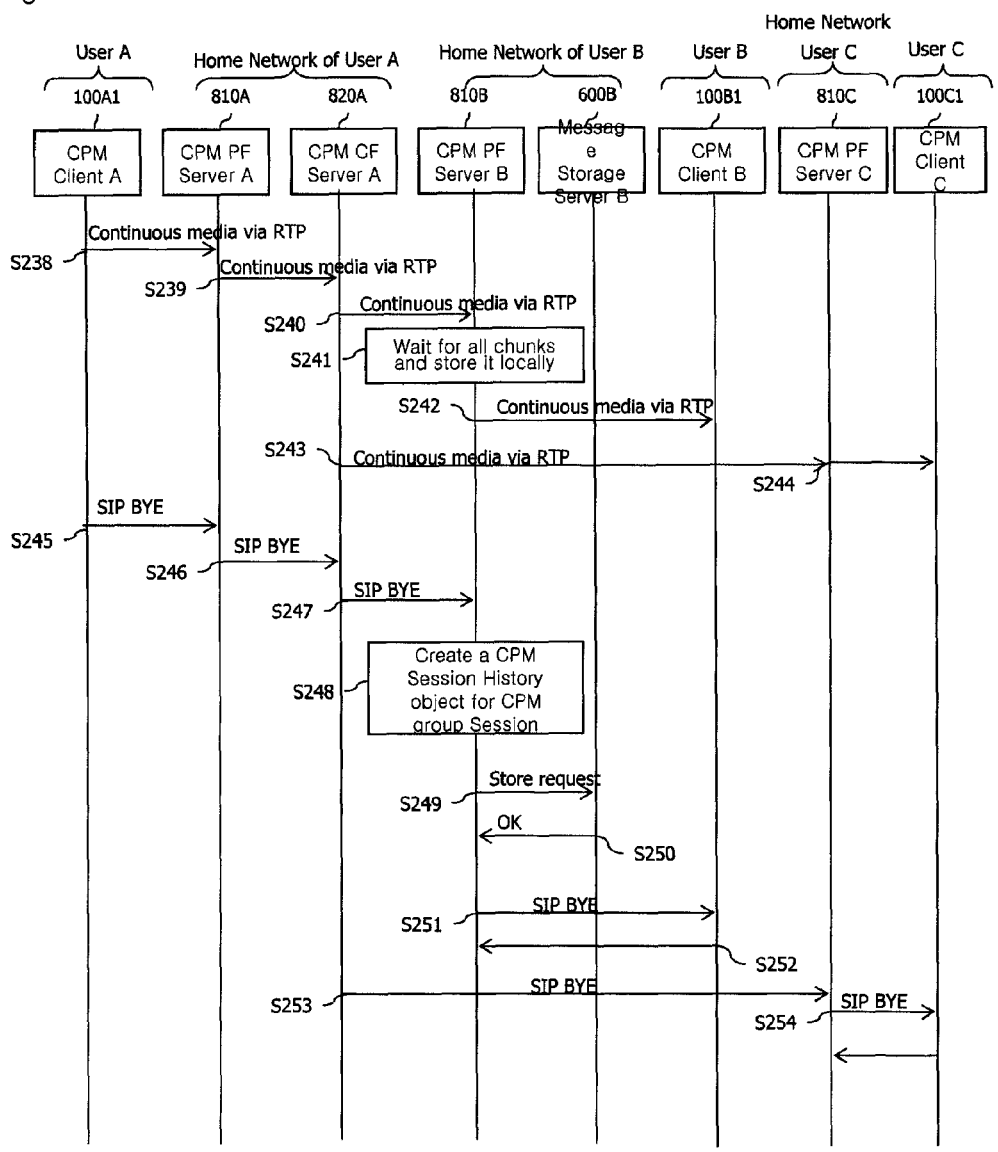

FIGS. 5 to 7 are flow charts illustrating the process of a second embodiment of the present invention.

In FIGS. 5 to 7, the terminal A1 100A1 of the user A, the terminal B1 100B1 of the user B, a terminal C1 100C1 of a user C, the home network of the user A, and the home network of the user B, and a home network of the user C are shown. The home network of each of the users includes CPM PF servers 810A, 810B, and 810C, CPM CF servers 820A, 820B, and 820C, and message storage servers 600A, 600B, and 600C, respectively. In FIGS. 5 to 7, the message storage server 600A of the home network of the user A is not illustrated. Also, the CPM CF server 820B and the message storage server 600B of the home network of the user C are not shown.

Each of the terminals includes a message storage client and a CPM client.

Each process will now be described with reference to FIGS. 5 to 7.

1) First, the terminal A1 100A1 of the user A and the terminal B1 100B1 of the user B establish a CPM session and transmit and receive messages for conversation (step S201).

2) During the conversation, a new user is added to the conversion between the user A and the user B, so in order to extend the conversation to multi-party conversation, e.g., conversation among the user A, the user B, and the user C, the terminal A 100A1 of the user A generates a session invitation message, e.g., an SIP-based INVITE message.

In this case, the terminal A 100A1 sets a Request-URI of the generated invitation message as a URI of the CPM CF already provisioned to the terminal (controlling Function provisioned in the CPM client). And, the terminal A 100A1 sets a CPM feature tag in an Accept-Contact header. The terminal A 100A1 sets a CPM feature tag in a Contact header. And then, when anonymity is requested, the terminal A 100A1 includes a temporary GRUU in a Contact header sender (the CPM client as a subject for sending a message), and when anonymity is not requested, the terminal A 100A1 includes a public GRUU in the Contact header sender.

Subsequently, the terminal A 100A1 includes information regarding a CPM release version supported in the User-Agent header.

Thereafter, the terminal A 100A1 adds a user to be invited to an MIME resource-list body of the message. In this case, the GRUU, which has been included in the Contact header of the message received during the session establishment process from the user who has initially participated, is also included. This is to prevent a phenomenon in which the session invitation message is unnecessarily transmitted to several terminals of the participant when the user who has initially participated owns several terminals and has had conversation by using a particular one of the terminals.

Meanwhile, the terminal A 100A1 includes a Session-Replace header and a Contribution-ID of the previous session in the session invitation message n order to the user which has initially participated.

The terminal A 100A1 checks whether or not the number of invited users does not exceed a maximum numerical value allowed in the group session. Subsequently, the terminal A 100A1 sets "multipart/mixed" in a content-type header of the session invitation message. And, the terminal A 100A1 includes an InReplyTo-Conversation-ID header, which has been used for the invitation message which was transmitted to establish the initial session for the one-to-one conversation, in the generated session invitation message. Also, the terminal A 100A1 may include a Conversation-id indicating a conversation ID in the initially established session in the generated session invitation message.

The terminal A 100A1 includes a MIMI SDP body in the generated session invitation message. In this case, content included in an SDF offer of the SDP body may be the same as information in the previous one-to-one conversation.

In this manner, when the session invitation message is completely generated, the terminal A 100A1 transmits the generated session invitation message to the CPM PF server A 810A (step S202).

3) Upon receiving the session invitation message, the CPM PF server A 810A checks the session invitation message as described above. And, the CPM PF server A 820A generates a new session invitation message on the basis of the received session invitation message, and transmits the same (step S203). This is the same as described above, so a repeated description thereof will be omitted.

4~5) Meanwhile, when the CPM CF server A 820A receives the session invitation message, the CPM CF server A 820A checks the session invitation message in the same manner as the CPM CF server A 810A has done.

Subsequently, the CPM CF server A 820A checks whether or not the SDP parameter of the SDP offer included in the session invitation message is allowed and whether or not it is supported by the CPM CF server A 820A. When the SDP parameter is not allowed, the CPM CF server A 820A transmits an SIP 488 "Not Acceptable here" in response.

The CPM CF server A 820A checks whether or not a Request-URI of the invitation message has been set as the address of the CPM CF server A 820A.

And then, the CPM CF server A 820A checks whether or not the session invitation message has been requested anonymously. When the session invitation message has been requested anonymously, the CPM CF server A 820A checks whether or not anonymity is allowed according to the policy of a service provider. When anonymity is not allowed, the CPM CF server A 820A transmits an SIP 403 "Forbidden" message in response.

Subsequently, the CPM CF server A 820A checks whether or not the number of participants included in the MIME resource-list body does not exceed a maximum numerical value. When the number of the participants exceeds the maximum numerical value, the CPM CF server A 820A transmits an SIP 486 "Busy Here" message in response.

Thereafter, the CPM CF server A 820A checks whether or not the MIME resource-list body includes an empty URI. When there is an empty URI, the CPM CF server A 820A transmits an SIP 403 "Forbidden" message in response.

When there is no empty URI, the CPM PF server A 820A extracts a list of members included in the MIME resource-list body.

Since the one-to-one conversation between the user A and the user B is changed to the group session according to the addition of the user C, the CPM CF server A 820A establishes the group session and assigns an ID to the group session.

Subsequently, the CPM CF server A 820A generates a session invitation message for the user C to be invited to the group session and the existing user B. In this case, the invitation message generated for the user B must include a Session-Replace header.

The CPM CF server A 820A transmits the generated session invitation message to the CPM PF server B 810B and the CPM PF server 820C, respectively (steps S204 and S205). In this case, the session invitation message to CPM PF server B 810B may include the GRUU of the terminal B1 100B1.

6) When the CPM PF server B 820B receives the session invitation message, it checks the session invitation message in the same manner as described above. And, the CPM PF server B 820B generates a session invitation message. Hereinafter, the same content as that described above will be omitted, and only the difference will be described.

The CPM PF server B 820B checks whether or not the Replace header is included in the received session invitation message. When the Replace header is included in the session invitation message, the CPM PF server B 810B immediately transfers the generated session invitation message to the terminal B1 100B1 of the user B (steps S206). Namely, when the session invitation message includes a header (i.e., Replace) indicating the replacement of the session and includes information indicating that the session is the same as the one-to-one session or is related to the one-to-one session, the CPM PF server B 810B immediately transfers the generated session invitation message only to the terminal B1 100B1 of the user B by using the GRUU of the terminal B1 100B1 included in the session invitation message, rather than to all of the terminals of the user B (namely, without performing forking).

7) Similarly, when the CPM PF server C 810C receives the session invitation message, it checks the session invitation message in the same manner as described above, and generates a new session invitation message. And then, the CPM PF server C 810C transmits the generated session invitation message to the terminal C1 100C1 (step S207).

When the CPM PF server B 810B receives a response message, e.g., an 200 OK message, from the terminal B1 100B1 (step S208), the CPM PF server B 810B checks a user setting of the user B in the same manner as the foregoing steps S108 and S109 (step S209), extracts "From" header, "To" header, "Date" header, Conversation ID, and Contribution ID from the session invitation request message and stores the same locally (step S210)

11) The CPM PF server B 810B generates a new response message, e.g., an SIP 200 "OK" message, on the basis of the response message received from the terminal B1 100B1.

Subsequently, the CPM PF server B 810B transmits the generated message to the SIP/IP core so as for the message to be transferred to the CPM CF server A 820A (step S211).

12~14) Meanwhile, when the CPM PF server C 810C receives a response message, e.g., an 200 OK message, from the terminal C1 100C1 (step S212), the CPM PF server C 810C generates a new response message, e.g., an SIP 200 "OK" message, on the basis of the response message received from the terminal C1 100C1 and transmits it to the SIP/IP core so that the response message can be transferred to the CPM CF server A 820A (step S213). The CPM CF server A 820A generates a new response message on the basis of the received response message and transmits it to the CPM PF server A 810A (step S214).

15) When the CPM PF server A 810A receives the response message, e.g., the SIP 200 "OK" message, the CPM PF server A 810A generates a new response message on the basis of the received response message, transmits the generated message to the SIP/IP core so that the message can be transferred to the terminal A1 100A1 of the user A (step S215).

16) When the terminal A1 100A1 receives a response message with respect to the session invitation message, the terminal A1 100A1 generates an acknowledgement message for a final acknowledgement, e.g., an SIP ACK message and transmits the message to the CPM PF server A 810A (step S216).

The terminal A1 100A1 stores the Contact header in the response message as a group session identifier. The terminal A1 100A1 starts an SIP session timer by using the value in a Session-Expires header in the received response message. And, the terminal A1 100A1 re-connects a media Plane to the CPM CF.

17~19) When the CPM PF server A 810A receives the acknowledgement message, the CPM PF server A 810A transmits the acknowledgement message to the CPM CF server A 820A (step S217), and the CPM CF server A 820A transmits it to the SIP/IP core network such that the acknowledgement message is transferred to the CPM PF server B 810B and the CPM PF server C 810C (steps S218 and S219).

20~21) The CPM PF server B 810B and the CPM PF server C 810C transmit the acknowledgement message to the terminal B1 100B1 and the terminal C1 100C1, respectively (steps S220 and S221).

22) When the terminal B1 100B1 receives the acknowledgement message, it starts media Plane. And, when the received session invitation message includes the Session-Replace header, the terminal B1 100B1 transmits a termination message, e.g., an SIP BYE message, to the CPM PF server B 810B in order to transmit it to the terminal A1 100A1, a counterpart of the one-to-one session which has been established (step S222).

23) When the termination message is first transmitted from the terminal B1 100B1 handled by the CPM PF server B 810B, the CPM PF server B 810B generates a termination message to be transmitted to the different terminal. Subsequently, the CPM PF server B 810B transmits the generated termination message to the CPM PF server A 810A.

24) When the termination message is first transmitted from the different terminal, e.g., the terminal B1 100B1, rather than from the terminal A1 100A1 handled by the CPM PF server A 810A, the CPM PF server A 810A checks whether or not the <allow-offline-storage> element has been set as "true" in the user setting of the user A. When the <allow-offline-storage> element has been set as "true", the CPM PF server-A 810A creates a CPM session history object by using the locally stored messages. Thereafter, the CPM PF server-A 810A transmits the created CPM session history object to the message storage server A 600A to request the message storage server A 600A to store the CPM session history object. The message storage server A 600A stores the object, and transmits a response message including information, e.g., a UID, regarding the object, e.g., an OK message, to the CPM PF server-A 810A.

Subsequently, since the termination message has been first transmitted from the different terminal, e.g., the terminal B1 100B1, not from the terminal A1 100A1 handled by the CPM PF server-A 810A, the CPM PF server-A 810A generates a termination message to be transmitted to the terminal A1 100A1. In this case, the CPM PF server-A 810A includes the information, e.g., the UID, regarding the object stored in the message storage server A 600A in the generated termination message.

And then, the CPM PF server-A 810A transmits the termination message to the terminal A1 100A1 (step S224).

25~26) When the terminal A1 100A1 receives the termination message, the terminal A1 100A1 transmits a response message, e.g., an SIP 200 OK message, to the CPM PF server-A 810A (step S225). When the CPM PF server-A 810A receives the response message, the CPM PF server-A 810A generates a new response message, e.g., an SIP 200 "OK" message, on the basis of the received response message in the same manner as in step S110, and transmits the new response message to the CPM PF server-B 810B (step S226).

27~29) When the CPM PF server-B 810B receives a response message from the different terminal with respect to the termination message transmitted by the terminal, e.g., the terminal B1 100B1, handled by the CPM PF server-B 810B, the CPM PF server-B 810B generates a response message to be transmitted to the terminal handled by the CPM PF server-B 810B.

Subsequently, the CPM PF server-B 810B checks whether or not the <allow-offline-storage> element has been set as "true" in the user setting of the user B.

When the <allow-offline-storage> element has been set as "true", the CPM PF server-B 810B creates a CPM session history object by using the locally stored messages (step S131). In detail, the CPM PF server-B 810B creates one CPM session history object by using information regarding the CPM session which has been established, the received media, and the received messages (step S227).

And then, the CPM PF server-B 810B transmits the created CPM session history object to the message storage server B 600B to request for the message storage server B 600B to store it (step S228).

The message storage server B 600B stores the object, and transmits a response message including information, e.g., UID, regarding the object, e.g., an SIP 200 OK message, to the CPM PF server-B 810B (step S229).

30) Then, the CPM PF server-B 810B includes the information, e.g., the UID, regarding the object stored in the message storage server B 600B in the response message which has been generated so as to be transmitted to the terminal B1.

Thereafter, the CPM PF server-B 810B transmits the response message to the terminal B100B (step S230).

31~37) Subsequently, the terminal A1 100A1 transmits a message for the CPM group session among user A, user B and user C, e.g., an MSRP SEND message, including one or a plurality of media, to the CPM PF server-A 810A (step S231). The CPM PF server-A 810A locally stores the message and then transmits the message to the CPM CF server A 820A (step S232).

The CPM CF server A 820A transfers the message to the CPM PF server B 810B (step S233). The CPM PF server B 810B waits until such time as all the chunks of the message are received. When all the chunks are received, the CPM PF server-B 820B locally stores the message (step S234) and transfers the message to the terminal B1 100B1 (step S235).

Meanwhile, the CPM CF server A 820A transfers the message to the CPM PF server C 810C (step S236). The CPM PF server C 810C may wait until such time as all the chunks of the message are received if user c's user preference regarding to recording CPM group session is set to true. When all the chunks are received, the CPM PF server-C 820C locally stores the message and transfers the message to the terminal C1 100C1 (step S237).

38~44) Subsequently, as can be understood with reference to FIG. 7, the terminal A1 100A1 transmits a message, e.g., an RTP message, including one or a plurality of media to the CPM PF server A 810A (step S238). The illustrated steps S239~S244 are the same as the foregoing steps S232~S237, so the repeated description will be omitted.

45) Meanwhile, in order to terminate the conversation, the terminal A1 100A1 generates a termination message, e.g., an SIP BYE message, and transmits the termination message to the CPM PF server A 810A (step S245). At this time, the terminal A1 100A1 releases the resources of all the media of the session to be terminated.

46~47) Upon receiving the termination message with respect to the ongoing session, the CPM PF server-A 810A releases the all the media resources with respect to the session.

When the termination message has been first transmitted from the terminal A 100A1 handled by the CPM PF server-A 810A, the CPM PF server-A 810A generates a termination message to be transmitted to the different terminal. And then, the CPM PF server-A 810A transmits the generated termination message to the CPM CF server-A 820A (step S246).

The CPM CF server A 820A transmits the termination message to the CPM PF server B 810B (step S247).

48) When the CPM PF server-B 810B receives the termination message with respect to the ongoing session, the CPM PF server-B 810B releases all the media resources with respect to the session.

When the termination message has been first transmitted from the different terminal, e.g., the terminal A1 100A1, rather than from the terminal B100B1 handled by the CPM PF server-B 810B, the CPM PF server-B 810B checks whether or not an <allow-offline-storage> element has been set as "true" in the user setting of the user B.

When the <allow-offline-storage> element has been set as "true", the CPM PF server-B 810B creates a CPM session history object by using the locally stored messages (step S248). In detail, the CPM PF server-B 810B generates one CPM session history by using the information regarding the CPM session which has been established, the received media, and the received messages.

Thereafter, the CPM PF server-B 810B transmits the created CPM session history object to the message storage server B 600B to request the message storage server B 600B to store the CPM session history object (step S249).

The message storage server B 600B stores the object, and transmits a response message including information, e.g., a UID, regarding the object, e.g., an SIP 200 OK message, to the CPM PF server-B 810B (step S250).

51) Thereafter, since the termination message has been first transmitted from the different terminal, e.g., the terminal A1 100A1, not from the terminal B1 100B1 handled by the CPM PF server-B 810B, the CPM PF server-B 810B generates a termination message to be transmitted to the terminal B1 100B1. In this case, the CPM PF server-B 810B includes the information, e.g., the UID, regarding the object stored in the message storage server B 600B, in the generated termination message.

And then, the CPM PF server-B 810B transmits the termination message to the terminal B1 100B1 (step S251).

52) When the terminal B1 100B1 receives the termination message, the terminal B1 100B1 releases the resource regarding the ongoing session, and transmits a response message, e.g., an SIP 200 OK message, to the CPM PF server-B 810B (step S252).

53) Meanwhile, the CPM CF server-A 820A transmits the termination message to the CPM PF server-C 810C (step S253), and the CPM PF server-C 810C transmits the termination message to the terminal C1 100C1 (step S254). In this case, as mentioned above, the CPM PF server-C 810C may create a CPM session history object according to a setting of the user C and store the created CPM session history object in the message storage server C 600C.

Similarly, the CPM PF server-A 810A may also create a CPM session history object and store the generated CPM session history object in the message storage server C 600C. according to a user setting, and store the created CPM session history object in the message storage server A 600A.

As described above, according to the second exemplary embodiment of the present invention, all the messages transmitted for conversation (even the session invitation message transmitted to establish the session for conversation) are stored by using the conversation ID and the contribution ID. Thus, the user A and the user B can read the stored conversation history any time through a certain terminal by using the conversation ID, the contribution ID, and the information regarding the object.

The method according to exemplary embodiments of the present invention described thus far may be implemented as software, hardware or a combination thereof. For example, the method according to exemplary embodiments of the present invention may be stored in a storage medium (e.g., an internal memory, a flash memory, a hard disk, or the like), and may be implemented as codes or commands in a software program that can be executed by a processor (e.g., a microprocessor). This will now be described with reference to FIG. 8.

Figure 8:
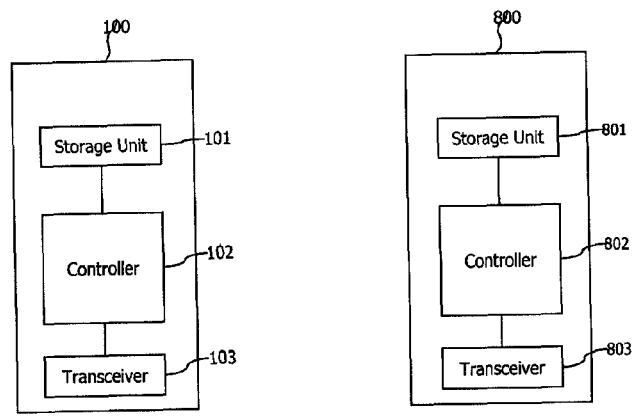
FIG. 8 is a schematic block diagram of a terminal 100 and a CPM server 800 according to an exemplary embodiment of the present invention.

FIG. 8 is a schematic block diagram of a terminal 100 and a CPM server 800 according to an exemplary embodiment of the present invention.

The CPM server 800 may be the CPM PF server A 810A, the CPM PF server B 810B, or the CPM PF server C 810C as mentioned above. Also, the CPM server 800 may be the CPM PF server A 820A, the CPM PF server B 820B, or the CPM PF server C 820C as mentioned above.

As shown in FIG. 8, the terminal 100 includes a storage unit 101, a controller 102, and a transceiver 103. The CPM server 800 includes a storage unit 801, a controller 802, and a transceiver 803.

The storage units 101 and 801 store the method illustrated in FIGS. 4 to 8.

The controllers 102 and 802 control the storage units 101 and 801 and the transceivers 103 and 803. In detail, the controllers 102 and 802 execute the methods stored in the storage units 101 and 801, respectively. Also, the controllers 102 and 802 transmit the foregoing signals via the transceivers 103 and 803.

As the present invention may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

The invention claimed is:

1. A method for transferring a converged IP messaging (CPM) service based message, the method performed by a server for handling terminals of a second user and the method comprising:
   transmitting, by the server, one or more messages via a one-to-one session established between a first terminal of a first user and a second terminal of the second user;
   receiving, by the server, a first session initiation protocol (SIP) invite message for extending the one-to-one session to a group session from the first terminal of the first user,
   wherein the first SIP invite message includes a header indicating the one-to-one session to be replaced by the group session, and a field indicating an identifier of the second terminal of the second user and an identifier of a third user, and
   extracting and locally storing, by the server, a 'From' header, a 'To' header, a 'Date' header, a same conversation ID and a new contribution ID from the received first SIP invite message;
   extracting and locally storing at least part of session description protocol (SDP) attributes associated with media streams from the received first SIP invite message if the received first SIP invite message includes SDP content describing the media streams;
   transmitting, by the server, a second SIP invite message to the second terminal of the second user in response to the reception of the first SIP invite message;
   receiving, by the server, a first termination message for terminating the one-to-one session from the second terminal of the second user;
   transmitting, by the server, a second termination message for terminating the one-to-one session to the first terminal in response to the reception of the first termination message;
   receiving, by the server, a first response message from the first terminal in response to the reception of the second termination message;
   constructing, by the server, a one session history object including all contents extracted and locally stored during the one-to-one session in response to the reception of the first termination message; and
   transmitting, by the server, a second response message for the first termination message to the second terminal of the second user.

2. The method of claim 1, further comprising:
   receiving, by the server, a third response message from the second terminal of the second user after transmitting the second SIP invite message to the second terminal of the second user; and
   transmitting, by the server, a fourth response message to the first terminal of the first user in response to the reception of the third response message.

3. The method of claim 2, further comprising:
   after transmitting the fourth response message, receiving, by the server, a first acknowledgement message from the first terminal; and
   transmitting, by the server, a second acknowledgement message to the second terminal in response to the reception of the first acknowledgement message.

4. The method of claim 1, wherein the transmitting of the second SIP invite message to the second terminal of the second user comprises:

checking, by the server, the first SIP invite message in response to the reception of the first SIP invite message; and if the first SIP invite message includes the header indicating the one-to-one session to be replaced by the group session and information indicating that the group session is same as the one-to-one session, transmitting, by the server, the second SIP invite message directly to only the second terminal of the second user rather than to all registered terminals of the second user.

5. The method of claim 1, wherein the first SIP invite message is an SIP-based INVITE message, the first response message is an SIP-based 200 OK message, and the first termination message is an SIP-based BYE message.

6. The method of claim 1, wherein the header indicating the one-to-one session to be replaced by the group session is a Session Replace header, the identifier of the second terminal is a GRUU, and the field indicating the identifier of the second terminal is a Request-URI field.

7. A method for transferring a converged IP messaging (CPM) service based message, the method is performed by a server for handling a source terminal and the method comprising:

receiving, by the server, a first session initiation protocol (SIP) invite message for establishing a CPM session between a source terminal and one or more target entities from the source terminal, wherein if there exists an existing conversation ID, the first SIP invite message includes the existing conversation ID, wherein if there is no existing conversation ID, the first SIP invite message includes a newly generated conversation ID, and wherein the first SIP invite message further includes a newly generated contribution ID;

extracting and locally storing, by the server, a 'From' header, a 'To' header, a 'Date' header, a same conversation ID and a new contribution ID from the received SIP invite message;

extracting and locally storing at least part of session description protocol (SDP) attributes associated with media streams from the first SIP invite message if the first SIP invite message includes SDP content describing the media streams;

transmitting, by the server, a second SIP invite message to the one or more target entities in response to the reception of the first SIP invite message;

receiving, by the server, a response message from the one or more target entities;

transferring, by the server, one or more messages including one or more of a text, an image, a video, and a voice between the source terminal and the one or more target entities through the established CPM session;

receiving, by the server, a termination message for terminating the established CPM session from the source terminal; and constructing a one session history object including all contents extracted and locally stored during the established CPM session in response to the reception of the termination message, wherein if each of the messages transmitted and received through the established CPM session includes real-time media, the real-time media is constructed as a single MIME object and the single MIME object is included in the session history object.

8. The method of claim 7, wherein the first SIP invite message is an SIP-based INVITE message, the response message is an SIP-based 200 OK message, and the termination message is an SIP-based BYE message.

9. The method of claim 7, further comprising:

checking a user preference with respect to a user of the source terminal after receiving the termination message, wherein the construction of the one session history object is performed if the user preference includes an element indicating that a history of the established CPM session has to be stored.

10. The method of claim 7, further comprising:

extracting information from the received termination message and locally storing the extracted information.

11. The method of claim 7, further comprising:

if each message is received in units of chunks, waiting for all chunks before delivering the message.

12. A converged IP messaging (CPM) server comprising:

a memory;

a transceiver; and a processor operably connected to the memory and the transceiver, the processor configured to:

control the transceiver to transmit one or more messages via a one-to-one session established between a first terminal of a first user and a second terminal of a second user;

control the transceiver to receive a first session initiation protocol (SIP) invite message for extending the one-to-one to a group session from the first terminal of the first user, wherein the first SIP invite message includes a header indicating the one-to-one session to be replaced by the group session, and a field indicating an identifier of the second terminal of the second user and an identifier of a third user, and extract and locally store in the memory a 'From' header, a 'To' header, a 'Date' header, a same conversation ID and a new contribution ID from the received first SIP invite message, extract and locally store in the memory at least part of session description protocol (SDP) attributes associated with media streams from the received first SIP invite message if the received first SIP invite message includes SDP content describing the media streams;

control the transceiver to transmit a second SIP invite message to the second terminal of the second user in response to the reception of the first SIP invite message;

control the transceiver to receive a first termination message for terminating the one-to-one session from the second terminal of the second user;

control the transceiver to transmit a second termination message for terminating the one-to-one session to the first terminal in response to the reception of the first termination message;

control the transceiver to receive a first response message from the first terminal in response to the reception of the second termination message;

construct a one session history object including all contents extracted and locally stored during the one-to-one session in response to the reception of the first termination message; and control the transceiver to transmit a second response message for the first termination message to the second terminal of the second user.

13. The CPM server of claim 12, wherein the processor is further configured to:

check the first SIP invite message in response to the reception of the first SIP invite message; and if the first SIP invite message includes a header indicating the one-to-one session to be replaced by the group session and information indicating that the group session is same as the one-to-one session, control the transceiver to transmit the second SIP invite message directly to only the second terminal of the second user, rather than to all registered terminals of the second user.

14. The CPM server of claim 12, wherein the first SIP invite message is an SIP-based INVITE message, the first response message is an SIP-based 200 OK message, and the first termination message is an SIP-based BYE message.

15. The CPM server of claim 12, wherein the header indicating the one-to-one session to be replaced by the group session is a Session Replace header, the identifier of the second terminal is a GRUU, and the field indicating the identifier of the second terminal is a Request-URI field.

* * * * *